Aug. 28, 1962     T. F. HART     3,051,230
GAS BURNER LINT SCREEN
Filed Aug. 4, 1960
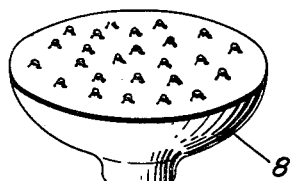
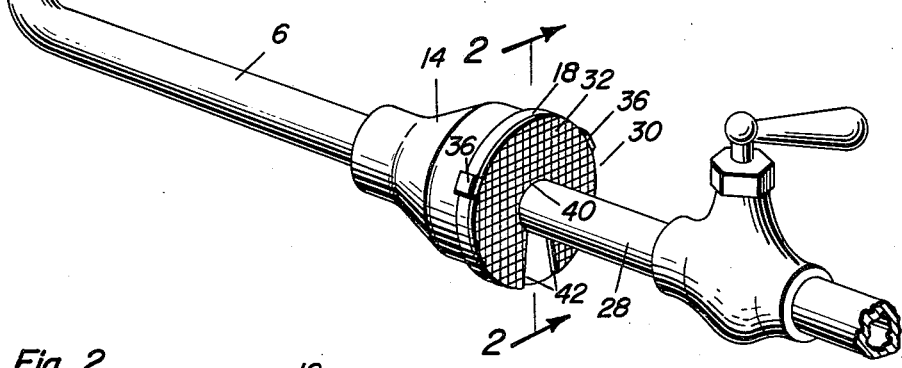
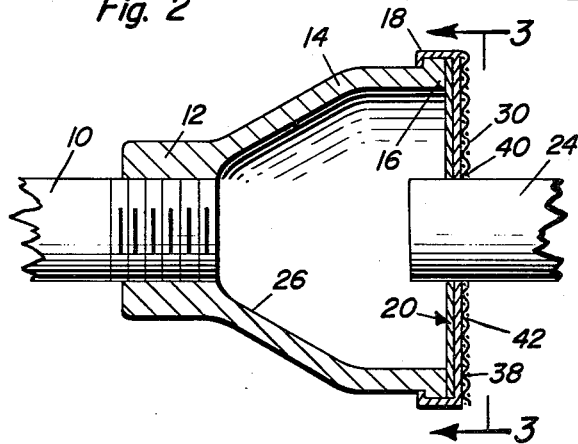
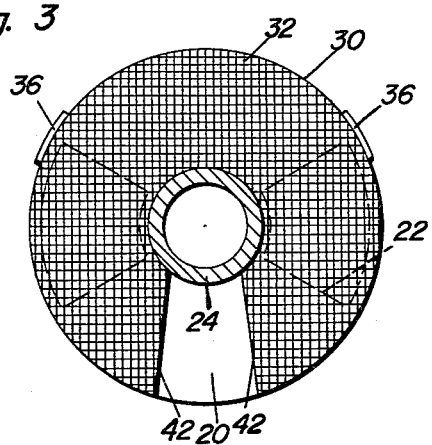
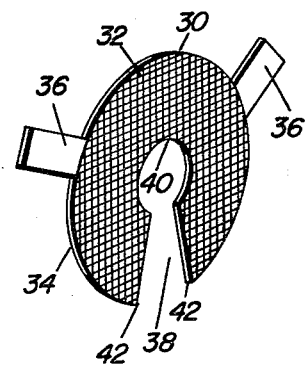
Thomas F. Hart
INVENTOR.

United States Patent Office 3,051,230
Patented Aug. 28, 1962

3,051,230
GAS BURNER LINT SCREEN
Thomas F. Hart, 1283 S. Clayton St., Denver, Colo.
Filed Aug. 4, 1960, Ser. No. 46,628
1 Claim. (Cl. 158—118)

This invention relates to a novel dust and lint intercepting filter for use in conjunction with an air shutter of a type commonly used on and in conjunction with a gas burner construction, for example, the type of a burner employed on domestic gas fired hot water heaters.

An object of the invention is to intercept dust, dirt and lint so that the same cannot be drawn through the air openings in the air shutter, settle in the throat pipe or reach and clog the burner head orifices.

As is known, when the air and gas mixing head or shell is open by way of the air shutter, the air which is drawn in invariably carries dust and lint which accumulates and, little by little, settles in the head and throat or pipe and eventually may reach the burner head itself. Then, too, this accumulation of extraneous matter often lodges in the mixing head, causes burning of raw gas and results in objectionable deposits of soot. In due time this sooting condition, as it is called in the trade, causes burner clogging and generates carbon monoxide fumes which could be dangerous, perhaps fatal to inhabitants of the area affected by the fumes. It follows that the chief objective in the present inventive effort is to recognize the problem and to solve it. To this end, the present invention has to do with the adoption and use of a simple, practical and reliable dust and dirt filter, one which fits on the air shutter.

An equally significant aspect of the over-all concept is the provision of a highly simple but feasible filtering screen which is such in construction that the man of the house, perhaps his wife too, can attend to the simple task of attaching and removing the screen so that by taking care of this job occasionally, the screen may be taken off, washed and dried and then put back in place without, of course, interfering with any part of the gas burner whereby to promote safety in the home and, at the same time, avoiding the expense and often inconvenience of having a private serviceman or a man from the gas company call for purposes of cleaning and conditioning the burner for satisfactory and serviceable operation.

In carrying out a preferred embodiment of the invention a screen, which may be classified as an attachment, is utilized. This screen may be of suitable construction and made from appropriate material such as would be recommended and endorsed by gas companies. In addition, the screen is such in construction in that it may be readily slipped into place and removed and is provided with easy-to-use bendable attaching ears or lugs which may be applied and removed with one's fingers, thus obviating the necessity of having to use special tools.

More specifically, the invention pertains to a screen or filter of the type stated which is provided with a central opening and a radial slot cooperable therewith, the opening and slot forming a keyhole-shaped slot or opening which accommodates itself to the usual centrally attached gas pipe, that is, the end of the gas pipe which is joined centrally to a conventional type air shutter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing a gas burner of a type commonly used in connected with gas fired hot water heaters and also showing the novel filter or screen and how it is constructed and used.

FIG. 2 is a section on a larger scale taken on the vertical line 2—2 of FIG. 1.

FIG. 3 is a section on the vertical line 3—3 of FIG. 2.

FIG. 4 is a view in perspective of the filtering screen by itself.

With reference first to FIG. 1 the first pipe, the one to the left in FIG. 1, constitutes a so-called throat pipe and this is denoted by the numeral 6. The upturned end thereof is provided with a suitable burner head 8. The opposite end portion 10 as shown in FIG. 2 has a tapering or conical shell attached thereto as at 12 and which shell provides a hollow air and gas mixing head 14. This is shown here at the intake end provided with an outstanding endless bead or flange 16 to which the attaching means 18 of the air shutter 20 is connected. The air shutter as shown in FIG. 3 is provided with customary segmental air openings or ports 22. The end portion 24 of the valved gas delivery or supply pipe or line is axially aligned with and delivers gas into the mixing chamber or cup 26. The gas pipe itself as shown in FIG. 1 is denoted by the numeral 28. The parts so far described are, of course, old and well known and the invention is used in combination therewith and also is to be interpreted as an attachment to be made and sold as such. In other words, the invention may be incorporated in the mixing head but made readily attachable and detachable as well as accessible. In any event, this attachment comprises a filter or screen 30 which is of ring-like form and which is of a diameter and is otherwise flat-sided and constructed to permit either side or surface thereof to be superimposed against the exterior surface of the air shutter 20 as illustrated in FIGURE 2. The screen portion is denoted at 32 and it will be noticed that the marginal edge 34 is provided at circumferentially spaced points with integrated lateral tongues 36 which provide spring metal attaching lugs or clips. These clips are retained in place over the rim of the air shutter in the manner shown, for example, in FIGS. 1 and 3. In order to accommodate the pipe end 24 the screen is provided at a point intermediate the spaced lugs 36 with a keyhole-shaped slot which is denoted as an entity by the numeral 38. This slot has a circular central portion 40 to embrace or encircle the pipe-end 24 in the manner shown in FIG. 2. The wedge-shaped portion defines spaced edges 42 which straddle the pipe and assist in keeping the same properly in position.

It follows that with this construction the user slips the screen into position causing the keyhole slot to fit in place around the pipe-end 24 in the manner shown. Then the clips or lugs 36 are sprung into place. Obviously, these springy lugs or clips 36 and keyhole slot cooperate in properly positioning the screen so that it spans and contacts the surface of the air shutter. Primarly however, the screen portions span the holes or openings in the air shutter and in this manner air which is drawn in for mixing with the gas is conditioned, as it were, by having the dust, dirt and lint separated therefrom.

At desired intervals the user may remove the screen, wash and dry it, and put it back again to serve its intended safeguarding purposes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

An attachment for an air shutter such as is commonly used on a gas burner construction comprising a flat-faced disk-shaped screen of prerequisite mesh and having a keyhole-shaped opening, the circular end portion of said opening being located at the axial center point of the screen and the companion wedge-shaped slot portion radiating from said circular portion and opening through a marginal edge portion of the screen, said screen also having resilient lugs projecting from said marginal edge, said lugs being spaced circumferentially from each other and from said slot portion, and constituting attaching and retaining clips capable of being readily applied and removed, said clips being located at the normal top portion of the screen, and the outer open end of the wedge-shaped slot portion being located at the central portion of the bottom of the screen and said lugs and slot being located at circumferentially spaced points around the marginal edge of the screen.

References Cited in the file of this patent

UNITED STATES PATENTS

| | | |
|---|---|---|
| 593,364 | Moore | Nov. 9, 1897 |
| 946,345 | Geurink | Jan. 11, 1910 |
| 991,141 | De Forest | May 2, 1911 |
| 1,451,116 | Robin | Aug. 10, 1923 |
| 1,742,613 | Moore et al. | Jan. 7, 1930 |
| 1,754,751 | Grayson | Apr. 15, 1930 |
| 1,974,975 | Stein et al. | Sept. 25, 1934 |

FOREIGN PATENTS

| | | |
|---|---|---|
| 226,225 | Switzerland | July 1, 1943 |
| 568,464 | Great Britain | Apr. 5, 1945 |